(12) United States Patent
Chow et al.

(10) Patent No.: US 6,301,704 B1
(45) Date of Patent: Oct. 9, 2001

(54) METHOD, SYSTEM, AND COMPUTER PROGRAM PRODUCT FOR USING STATIC SINGLE ASSIGNMENT FORM AS A PROGRAM REPRESENTATION AND A MEDIUM FOR PERFORMING GLOBAL SCALAR OPTIMIZATION

(75) Inventors: Frederick Chow; Sun Chan, both of Fremont; Peter Dahl, Cupertino; Robert Kennedy, Boulder Creek; Shin-Ming Liu, Saratoga; Raymond Lo, Sunnyvale; Mark Streich, Fremont; Peng Tu, Union City, all of CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/097,672

(22) Filed: Jun. 16, 1998

(51) Int. Cl.[7] .................................................... G06F 9/445
(52) U.S. Cl. ...................................................... 717/9; 717/5
(58) Field of Search .................................. 717/9, 5, 6, 7, 717/8

(56) References Cited

U.S. PATENT DOCUMENTS 5,659,754 * 8/1997 Grove et al. ............................. 717/9
5,768,596   6/1998 Chow et al. ......................... 395/709

OTHER PUBLICATIONS

Chow et al., "A New Algorithm for Partial Redundancy Elimination based on SSA Form", *Proceedings of the ACM SIGPLAN '97 Conference on Programming Language Design and Implementation (PLDI)*, Jun. 15–18, 1997, pp. 273–286.

Chow et al., "Effective Representation of Aliases and Indirect Memory Operations in SSA Form", *Proceedings of the Sixth International Conference on Compiler Construction*, Apr. 1996, pp. 253–267.

Cocke, J. and Ken Kennedy, "An Algorithm for Reduction of Operator Strength", *Communications of the ACM*, vol. 20, No. 11, Nov. 1977, pp. 850–856.

Cytron et al., "Efficiently Computing Static Single Assignment Form and the Control Dependence Graph", *ACM Transactions on Programming Language and Systems*, vol. 13, No. 4, Oct. 1991, pp. 451–490.

Kennedy et al., "Strength Reduction via SSAPRE", *Proceedings of the Seventh International Conference on Compiler Construction*, Mar. 1998, pp. 144–158.

Liu et al., "Loop Induction Variable Canonicalization in Parallelizing Compilers", *Proceedings of the 1996 Conference on Parallel Architectures and Compilation Techniques (PACT '96)*, 1996, pp. 228–237.

(List continued on next page.)

*Primary Examiner*—Mark R. Powell
*Assistant Examiner*—Ted T. Vo
(74) *Attorney, Agent, or Firm*—Sterne Kessler Goldstein & Fox P.L.L.C.

(57) ABSTRACT

A method, system, and computer product uses a hashed static single assignment (SSA) form as a program representation and a medium for performing global scalar optimization. A compiler, after expressing the computer program in SSA form, can perform one or more static single assignment (SSA)-based, SSA-preserving global scalar optimization procedures on the SSA representation. Such a procedure modifies, (i.e., optimizes) the SSA representation of the program while preserving the utility of its embedded use-deprogram information for purposes of subsequent SSA-based, SSA-preserving global scalar optimizations. This saves the overhead expense of having to explicitly regenerate use-def program information for successive SSA-based, SSA-preserving global scalar optimizations.

3 Claims, 10 Drawing Sheets

OTHER PUBLICATIONS

K. Cooper and T. Simpson, "Value–driven Code Motion", Technical Report CRPC–TR95637–S, Dept. of Computer Science, Rice University, Oct. 1995.

J. Choi, R. Cytron, and J. Ferrante, "Automatic Construction of Sparse Data Flow Evalution Graphs", *Conference Record of the Eighteenth ACM Symposium on Principles of Programming Languages*, pp. 55–66, Jan. 1991.

K. Drechsler and M. Stadel, "A Variation of Knoop, Rüthing and Steffen's Lazy Code Motion", *ACM SIGPLAN Notices*, 28(5):29–38, May 1993.

Knoop, J. et al., "Optimal Code Motion: Theory and Practice", *ACM Trans. on Programming Languages and Systems*, 16(4):1117–1155, Jul. 1994.

Knoop, J. et al., "Lazy Code Motion", *Proceedings of the ACM SIGPLAN '92 Conference on Programming Language Design and Implementation*, pp. 224–234, Jun. 1992.

Dhamdhere, D. et al., "How to Analyze Large Programs Efficiently and Informatively", *Proceedings of the ACM SIGPLAN '92 Conference on Programming Language Design and Implementation*, pp. 212–223, Jun. 1992.

Johnson, R., "Efficient Program Analysis Using Dependence Flow Graphs", Technical Report (PhD Thesis), Dept. of Computer Science, Cornell University, pp. iii–xi and 1–230, Aug. 1994.

P. Briggs and K. Cooper, "Effective Partial Redundancy Elimination", *Proceedings of the ACM SIGPLAN '94 Conference on Programming language Design and Implementation*, pp. 159–170, Jun. 1994.

Muchnick, Steven S., *Advanced Compiler Design and Implementation*, Morgan Kauffman Publishers, Inc., 1997, pp. 745–746.

E. Morel and C. Renvoise, "Global Optimization by Suppression of Partial Redundancies", *Communications of the ACM*, vol. 22, No. 2, Feb. 1979, pp. 96–103.

* cited by examiner

METHOD, SYSTEM, AND COMPUTER PROGRAM PRODUCT FOR USING STATIC SINGLE ASSIGNMENT FORM AS A PROGRAM REPRESENTATION AND A MEDIUM FOR PERFORMING GLOBAL SCALAR OPTIMIZATION

CROSS-REFERENCE TO RELATED APPLICATIONS

This application is related to the following commonly-owned applications:

"Method, System, and Computer Program Product for Performing Register Promotion via Load and Store Placement Optimization within an Optimizing Compiler" by Chow et al., filed concurrently herewith;

"Method, System, and Computer Program Product for Extending Sparse Partial Redundancy Elimination to Support Speculative Code Motion within an Optimizing Compiler" by Lo et al., filed concurrently herewith;

"System, Method, and Computer Program Product for Partial Redundancy Elimination Based on Static Single Assignment Form During Compilation," application Ser. No. 08/873,895, filed Jun. 17, 1997; and "System, Method, and Computer Program Product to Efficiently Represent Aliases and Indirect Memory Operations in Static Single Assignment Form During Compilation," application Ser. No. 08/636,605, filed Apr. 23, 1997.

These applications are incorporated herein by reference in their entirety.

BACKGROUND OF THE INVENTION

1. Field of the Invention

The present invention relates generally to optimization of computer programs and more particularly to efficient performance of optimizing compilation.

2. Related Art

Current global scalar optimization technology requires the compiler to transform a source code program into an equivalent intermediate representation (IR). Based on the IR, the compiler then generates additional information about the program, e.g., the places in the program where each variable is defined and used (referred to as use-def information). A global scalar optimization procedure uses the IR and the program information to transform the IR. This transformed version of the IR, once compiled, should execute more quickly than the original version of the program. In this sense, the program has undergone an optimization during compilation.

Some global scalar optimizations, however, fail to transform the program information when they transform the IR into a new IR. If so, the program information, which has not been transformed, is no longer useful for purposes of subsequent optimization. If additional optimizations are to be performed, they must be performed on the current, transformed version of the IR, to which the previously generated program information no longer corresponds. That program information is now irrelevant. Hence an additional optimization will require that new program information be generated, based on the new IR, before this IR can be further optimized. Therefore, any optimization that transforms the current version of the IR only, and, in so doing, renders the existing program information obsolete, necessitates regeneration of the program information if subsequent optimization is required. This regeneration represents costly overhead each time a subsequent global scalar optimization procedure is performed.

Therefore, what is needed is a method, system, and computer program product for global scalar optimization that operates on a source program to produce an IR and its associated program information, where each optimization procedure transforms the program information as well as the IR. This would allow performance of subsequent optimization procedures without having to regenerate updated program information each time.

SUMMARY OF THE INVENTION

The present invention is a method and system for using static single assignment (SSA) form as a program representation and a medium for performing global scalar optimization. A compiler first expresses the computer program in SSA form, which serves as both the IR and the program information. The compiler can then perform one or more static single assignment (SSA)-based, SSA-preserving global scalar optimization procedures on the SSA form. Such a procedure modifies the SSA form of the program while preserving the utility of the SSA form for purposes of subsequent optimizations.

An advantage of the present invention is that when the SSA form is transformed during an SSA-based, SSA-preserving optimization procedure, the program information incorporated in the SSA form is necessarily transformed as well. A subsequent SSA-based, SSA-preserving optimization therefore does not require separate regeneration or updating of program information before the optimization can be executed. This saves time during the optimization process.

Further features and advantages of the invention as well as the operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENTS

I. Overview
II. Terminology
III. Transformation of source code into HSSA form
IV. SSA-based, SSA-preserving optimizations
V. Other embodiments
VI. Environment
VII. Conclusion

DETAILED DESCRIPTION OF THE PREFERRED EMBODIMENTS

I. Overview

The present invention relates to expression of a computer program in a way that permits efficient global scalar optimization of the program during compilation.

Current global scalar optimization technology requires the compiler to transform a source code program into an equivalent IR. Based on the IR, the compiler then generates an additional body of program information supplementing the IR and corresponding to the IR. A global scalar optimization algorithm uses both the IR and the program information to transform the IR. The transformed version of the IR, if compiled, would execute more quickly than the original version of the program. In this sense, the program has undergone an optimization.

Some global scalar optimizations fail to transform the program information when they transform the IR. If the optimization is in this category, the generated program information is no longer useful for purposes of subsequent optimizations. If additional optimizations are to be performed, they must be performed on the current, transformed version of the IR. to which the previously generated program information no longer corresponds. The program information is now irrelevant. Hence an additional optimization will require that new program information be generated, based on the new IR, before this IR can be further optimized. Therefore, any optimization that transforms the current version of the IR, but, in so doing, renders the program information obsolete, necessitates regeneration of this information if subsequent optimization is required.

The current invention obviates the need for regeneration of use-def program information for each successive optimization. Here the compiler constructs the IR in the SSA form. Such a form combines the IR and use-def program information in a single entity. Moreover, optimizing transformations are limited to those that not only transform the IR, but also update the use-def program information that is embodied with the IR in the SSA form. Hence the IR and use-def program information continue to correspond even after optimization. Hence subsequent optimizations do not require separate regeneration of use-def program information. Rather, this information, integrated in the SSA form, is transformed whenever the SSA form is transformed, so that separate regeneration of use-def program information is unnecessary for a subsequent SSA-based optimization.

Figure 1:
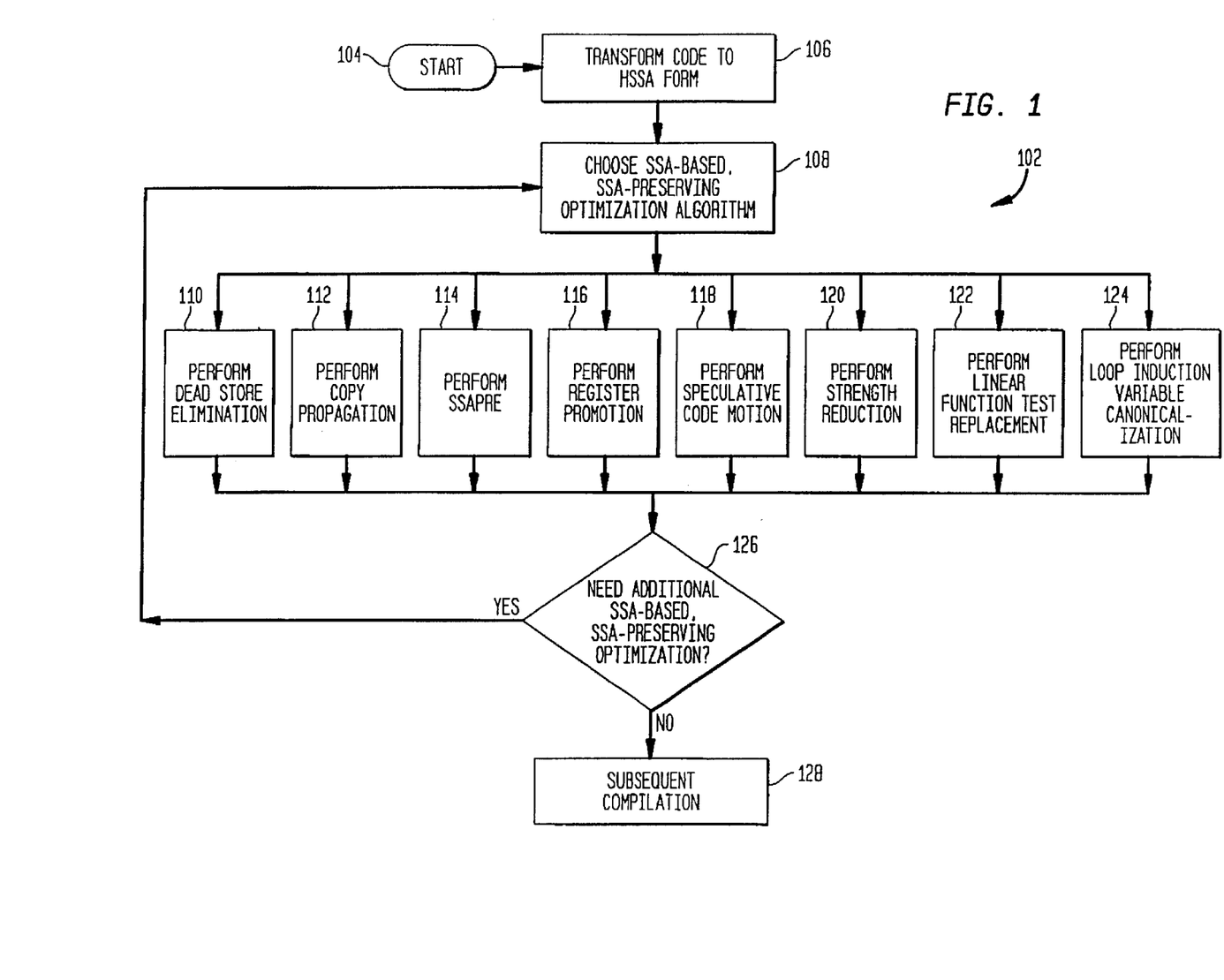
FIG. 1 is a flowchart representing the overall preferred operation of an embodiment of the present invention.

The embodiment described herein employs hashed static single assignment (HSSA) form, a specific type of SSA form. FIG. 1 is a flowchart of a routine 102 for a global scalar optimization process using an HSSA form according to an embodiment of the present invention. Such a global optimization is started during compilation (step 104). Source code is then transformed into HSSA form (step 106). In step 108, an SSA-based, SSA-preserving optimization is chosen from among the optimizations represented by steps 110 through 124. After the chosen optimization is completed, further SSA-based, SSA-preserving optimization may be required in step 126. if so, an additional SSA-based, SSA-preserving optimization be chosen by returning to step 108. If no additional SSA-based, SSA-preserving optimization is required in step 126, then the optimized IR is passed to subsequent compilation processes in step 128.

The operation of each of these steps is described in further detail below with respect to an example system 200 in FIG. 2. System 200 includes a memory 201, an HSSA expresser 203, and a selector entity 205. Memory 201 stores source code 202, which is input to HSSA expresser 203. HSSA expresser 203 then expresses the source code in an HSSA form 204. HSSA form 204 is then sent (as an optimization input 207) to one of the SSA-based, SSA-preserving optimizers 210 through 224 (collectively labeled 208) chosen by a selector 205. The transformed HSSA 206 that is produced by one of the optimizers then comes under the control of the selector 205 once again. If additional SSA-based, SSA-preserving optimization is required, the selector 205 again chooses one of the SSA-based, SSA-preserving optimizers 210 through 224 to further optimize the transformed HSSA 206. If additional SSA-based, SSA-preserving optimization is not required, the selector 205 forwards the transformed HSSA 206 (now labeled as the final optimized HSSA 225) to subsequent compilation processes 208.

II. Terminology

Several terms recurring herein are defined below.

Intermediate representation (IR): This refers to a form of a source code program upon which optimization procedures may be performed. An IR is "intermediate" in that it is derived from source code during compilation, but is not in an executable form.

Program information: This refers to information about a program that can be used by an optimization procedure to optimize the program.

Use-def program information: This refers to the locations, within an IR, of scalar variable definitions and their subsequent occurrences.

Static single assignment (SSA) form: This refers to a type of combined program information and associated IR. In an SSA form, use-def information is explicitly represented. A program is in SSA form if every variable that is assigned a value in the program occurs as the target of only one assignment.

Hashed static single assignment (HSSA): This refers to a particular method of representing SSA program information. HSSA form represents the expression of the original source code program in a hash table format. Each entry in the hash table is either an operand or an operator. Additional characteristics of HSSA form are provided in the discussion below. SSA-based optimization: This refers to an optimization which uses an SSA form as an input to the optimization process.

Non-SSA-based optimization: This refers to an optimization which uses program information in a format other than SSA.

SSA-preserving optimization: This refers to an SSA-based optimization which modifies the SSA form, both use-def program information and the IR, so that the resulting use-def program information and IR will correspond after the optimization. In other words, the resulting use-def program information is still descriptive of the resulting IR, even after optimization. Hence the utility of the resulting SSA form is "preserved" for subsequent SSA-based optimization.

Non-SSA-preserving optimization: This refers to an SSA-based optimization which optimizes the IR, but does not update the use-def pro(gram information contained in the SSA form. The SSA use-def program information and the modified IR therefore do not correspond after the optimization, in that the use-def program information is no longer descriptive of the new IR. Such an optimization therefore destroys the utility of the ssa form for purposes of subsequent optimization.

III. Transformation of Source Code Into HSSA Form

Before performing an SSA-based, SSA-preserving optimization on a source code program, the source code must first be converted into an SSA form, HSSA, which provides SSA use-def program information in addition to the IR.

Figure 2:
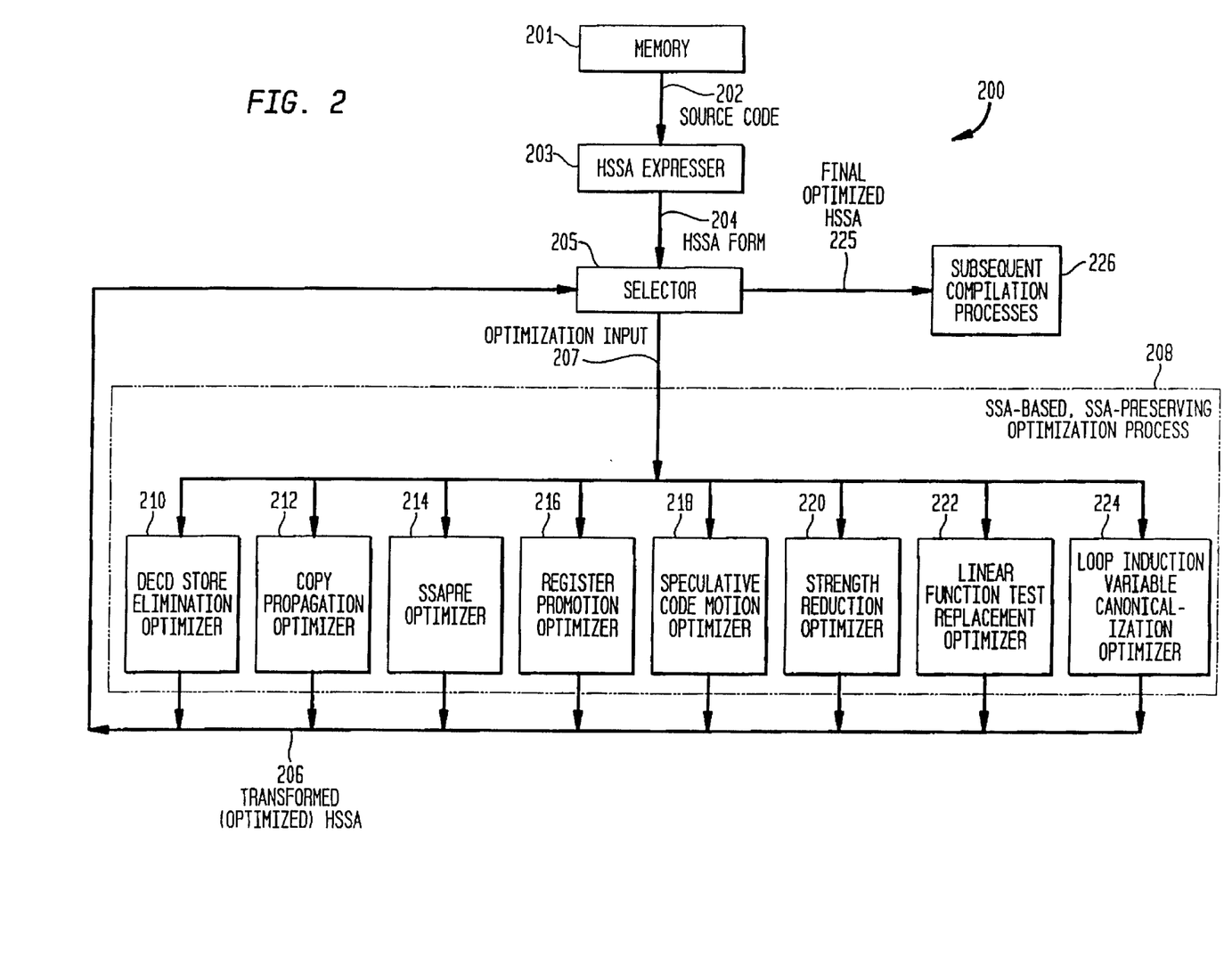
FIG. 2 is a diagram illustrating source code optimization using HSSA form, according to an embodiment of the invention.

Referring to FIGS. 1 and 2, in step 106, original source code 202 is transformed into an HSSA form 204 by an HSSA expresser module 203. In any HSSA form, each variable definition is given a unique version in the SSA form. Different variable versions are treated as different program variables. Each use of a variable version refers to a single reaching definition. In the SSA form, if several definitions of a variable reach a merging, node in the control flow graph of the program, the definitions are merged into a new version of that variable. Each variable definition in the SSA form must dominate all its uses in the control flow graph of the program. Moreover, identical versions of the same variable must have the same value.

HSSA form is a particular form of SSA form in a number of respects. For example, aliasing of scalar variables can lead to a significant increase in the number of variable versions in conventional SSA form; HSSA form avoids this increase by the use of so-called zero versions of a variable. A zero version represents those versions of the variable that are created in the normal course of SSA form generation; the new version of a variable created at a merging node in the control flow graph of a program, described above, is an example of a variable created during SSA form generation. Moreover, the lifetimes of different versions of the same variable are not allowed to overlap. HSSA form also implements the concept of virtual variables. Virtual variables model those variables that are accessed indirectly, e.g., through the use of pointers. Such variables can then be treated as ordinary scalar variables during subsequent optimization. HSSA form also represents the expressions of the original source code program in a hash table format, where each entry in the table is either an operand or an operator.

Details regarding conversion of source code to HSSA form, as well as SSA and HSSA representation are provided in a commonly-owned, co-pending application entitled "A System and Method to Efficiently Represent Aliases and Indirect Memory Operations in Static Single Assignment Form During Compilation," assigned application Ser. No. 08/636,605 (attorney docket number 15-4-324.00), and incorporated herein by reference in its entirety.

IV. SSA-Based, SSA-Preserving Optimizations

Once a source program has been represented in HSSA form, a specific optimization procedure may be chosen by a selector entity 205 in step 108. Note that the selector entity 205 may be either a human operator or an automated decision-making entity, such as a computer. In one embodiment, the selector entity 205 performs no processing on its input other than to route HSSA form 204, as an optimization input 207, to another process. The choice of optimizations is limited to those which operate on SSA forms (which include HSSA forms), i.e., SSA-based optimizations. The choice of optimizations is also limited to those which transform SSA forms (including HSSA forms), so that the utility of the use-def program information in the SSA forms is maintained for subsequent use, i.e., SSA-preserving optimizations. A resulting set of available optimizations for this embodiment is identified in FIG. 2 as SSA-based, SSA-preserving optimizations 208. The HSSA form 204 becomes an optimization input 207 to an optimization selected by the selector entity 203.

In the embodiment of the invention illustrated in FIGS. 1 and 2, eight such optimizations are available. In step 110, dead store elimination is performed by a dead store elimination optimizer 210. Here, the optimization input 207 is analyzed to find all code that is never executed, or statements that compute values that are never used. Such code is useless, or "dead," and so wastes memory and execution time. This optimization eliminates such code. Dead store elimination is well known in the art and need not be described in further detail.

In step 112, copy propagation is performed by a copy propagation optimizer 212. Here the optimization input 207 is analyzed to find situations where a variable is assigned a value and where subsequent variables receive the value of the first. This procedure eliminates unnecessary copying. Consider the following sequence:

A :=2

B :=A

In such a case, the program could be optimized by assigning the value 2 to variable B directly, and, provided that variable A does not otherwise need the value 2, eliminating the first assignment. Copy propagation is also well known in the art and need not be described in further detail.

In step 114, SSA partial redundancy elimination (SSAPRE) is performed by a SSAPRE optimizer 214. Here the compiler analyzes the optimization input 207 to find partial redundancies, then converts them to full redundancies, which can be eliminated through subsequent optimizations. SSAPRE is described in greater detail in a commonly-owned, co-pending application entitled "A System, Method and Computer Product for Partial Redundancy Elimination Based on Static Single Assignment Form During Compilation," having application Ser. No. 08/873, 895 (attorney docket number 15-4-479.00), incorporated herein by reference in its entirety.

In step 116, register promotion is performed by a register promotion optimizer 216. Here the compiler creates symbolic registers to hold the values of computations that are to be re-used. When actual register allocation is performed, the symbolic registers for which timely access would be most beneficial to program performance are assigned real registers. Remaining symbolic registers are assigned to memory. This represents an optimization because access to a register is faster than access to memory. Register promotion is described in greater detail in a commonly-owned, co-pending application filed concurrently herewith, entitled "Method, System, and Computer Program Product for Performing Register Promotion via Load and Store Placement Optimization within an Optimizing Compiler" having application number TBA (Attorney Docket No. 15-4-658.00) incorporated herein by reference in its entirety.

In step 118, speculative code motion is performed by a speculative code motion optimizer 218. Speculative code motion refers to the compiler's placement of computations (e.g., expressions, loads, stores, assignments, etc.) in positions in the program that results in some paths being executed more efficiently while some paths execute less efficiently. By placing more time-consuming operations in less frequently executed paths, and less time-consuming operations in more frequently executed paths, the overall efficiency of the program can be improved. Speculative code motion is described in greater detail in a commonly-owned, co-pending application filed concurrently herewith, entitled "Method, System, and Computer Program Product for Extending Sparse Partial Redundancy Elimination to Support Speculative Code Motion within an Optimizing Compiler" having application number TBA (Attorney Docket No. 15-4-721.00), incorporated herein by reference in its entirety.

In step 120, strength reduction is performed by a strength reduction optimizer 220. Here the compiler replaces relatively slow, complex operations with faster, simpler operations. An example would be the replacement of a multiplication by an addition. If, for instance, a loop contains induction variables I and J in the following code segment     I :=I+1

J :=I*2 then it may be more efficient to replace the second assignment with

J :=J+2 if such a replacement leaves the logic of the code unchanged otherwise. Strength reduction is well known in the art. Note that strength reduction, and, in particular, strength reduction using SSAPRE, is documented further by Kennedy el al. in "Strength Reduction via SSAPRE," *Proceedings of the Seventh International conference on Compiler Construction*, March 1998, pp.144–158.

In step 122, linear function test replacement is performed by a linear function test replacement optimizer 222. Here the optimizer 222 performs strength reduction in the context of program loops in order to replace induction variables. The compiler locates the comparison operator that controls iteration of the loop and replaces the test with another, so as to allow removal of the original induction variable by dead code elimination. Linear function test replacement is well known in the art, and is documented further by Cocke et al., in "An Algorithm for Reduction of Operator Strength," *Communications of the ACM*, 1977, pp. 850–856, and by Kennedy et al. in "Strength Reduction via SSAPRE," *Proceedings of the Seventh International Conference on Compiler Construction*, March 1998, pp. 144–158.

In step 124, the loop induction variable canonicalization is performed by a loop induction variable canonicalization optimizer 224. Here a loop is transformed so as to use a single primary induction variable that is incremented by one after each iteration. Other induction variables in the loop are removed, with their original references expressed in terms of the primary induction variable. Loop induction variable canonicalization is described in greater detail in "Loop Induction Variable Canonicalization," Liu et al., *Proceedings of the Fourth International Conference on Parallel Architectures and Compilation Techniques*, January 1996, pp. 273–286.

Note that all of these optimizations are SSA-preserving, so that after any of them has completed processing, the resulting transformed HSSA form 206 may again serve as optimization input 207 for another optimization chosen in step 108, should additional optimization be required in step 126. These optimizations may be executed an arbitrary number of times, in an arbitrary sequence. When no further optimization is required in step 126, a final optimized HSSA form 225 is submitted to subsequent compilation processes 226.

Note also that while the embodiment described here identifies eight specific SSA-based, SSA-preserving optimizations, this description is illustrative and not intended to limit the present invention. Other embodiments of the invention may utilize a greater or lesser number, or may use other known or future SSA-based, SSA-preserving optimizations not discussed here.

V. Other Embodiments

The invention may also be embodied so as to use SSA forms other than HSSA. In general, the invention may use any SSA form of a source code program. The invention may also be embodied in a compiler which allows a variety of optimizing transformations to take place in addition to the SSA-based, SSA-preserving optimizations described above. These additional optimizations may not be SSA-preserving, or may not be SSA-based.

Figure 3:
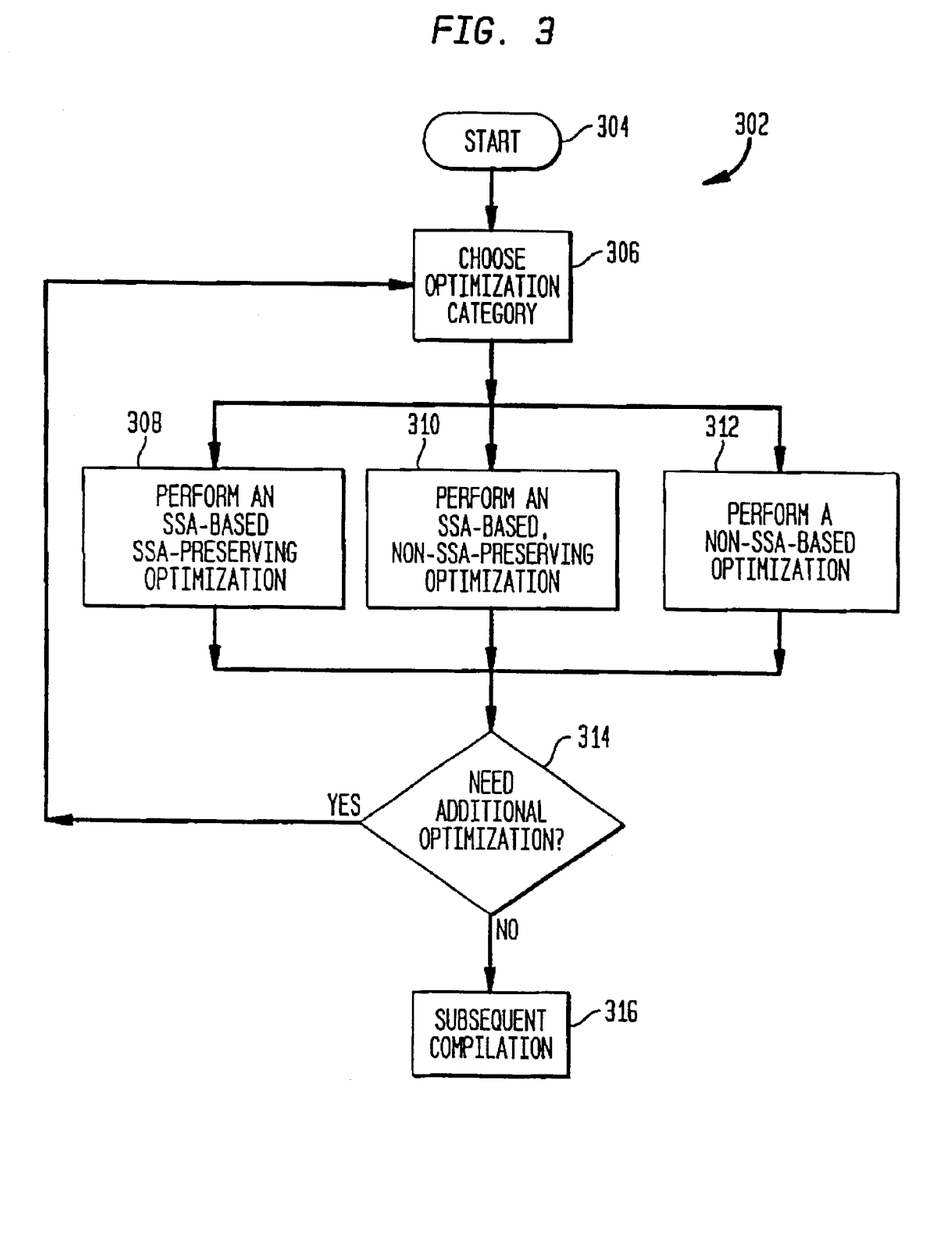
FIG. 3 is a flowchart representing the operation of an embodiment of the invention that includes SSA-based, non-SSA-preserving optimizations, and non-SSA-based optimizations.
Figure 4:
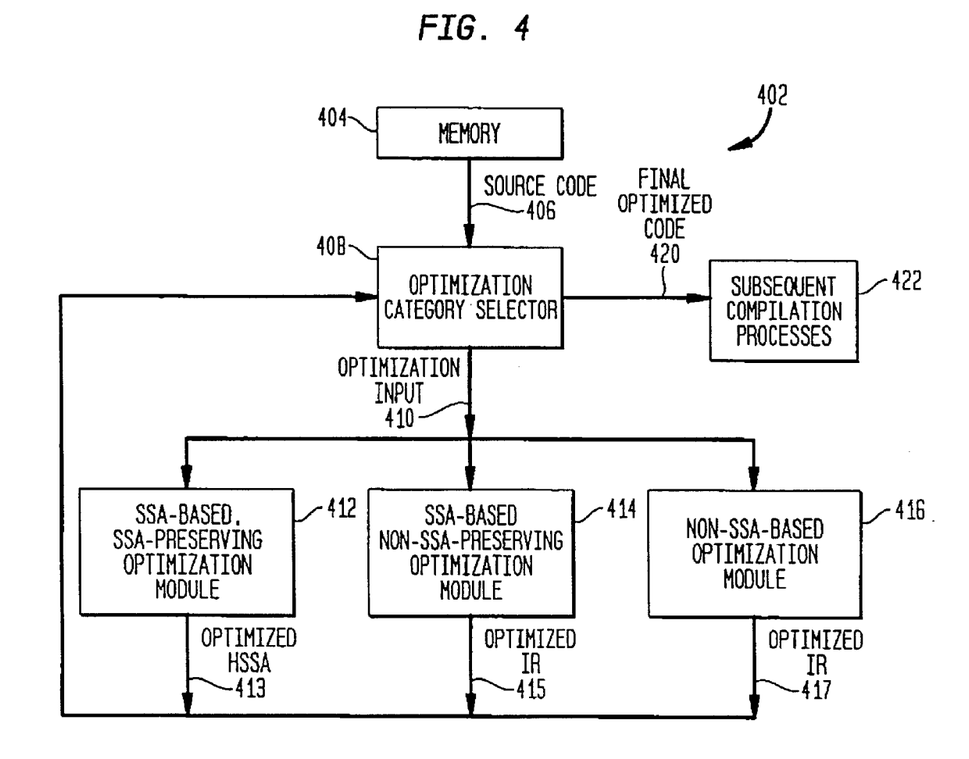
FIG. 4 is a diagram illustrating the operation of an embodiment of the invention that includes SSA-based, non-SSA-preserving optimizations, and non-SSA-based optimizations.

One such embodiment is illustrated in FIGS. 3 and 4. In step 306 an optimization category is chosen for a source code program 406 by an optimization category selector entity 408. Note that the selector entity 408 may be either a human operator or an automated decision-making entity, such as a computer. In one embodiment, optimization category selector entity 408 performs no processing on its input other than to route source code 406, in the form of optimization input 410, to another process. Under the control of the selector entity 408, the source code 406 serves as an optimization input 410 to one of three optimization modules 412 through 416.

In step 308, SSA-based, SSA-preserving optimizations are performed by an SSA-based, SSA-preserving optimization module 412. Step 308 is illustrated in greater detail in FIG. 5. Module 412 is illustrated in greater detail in FIG. 6.

Figure 5:
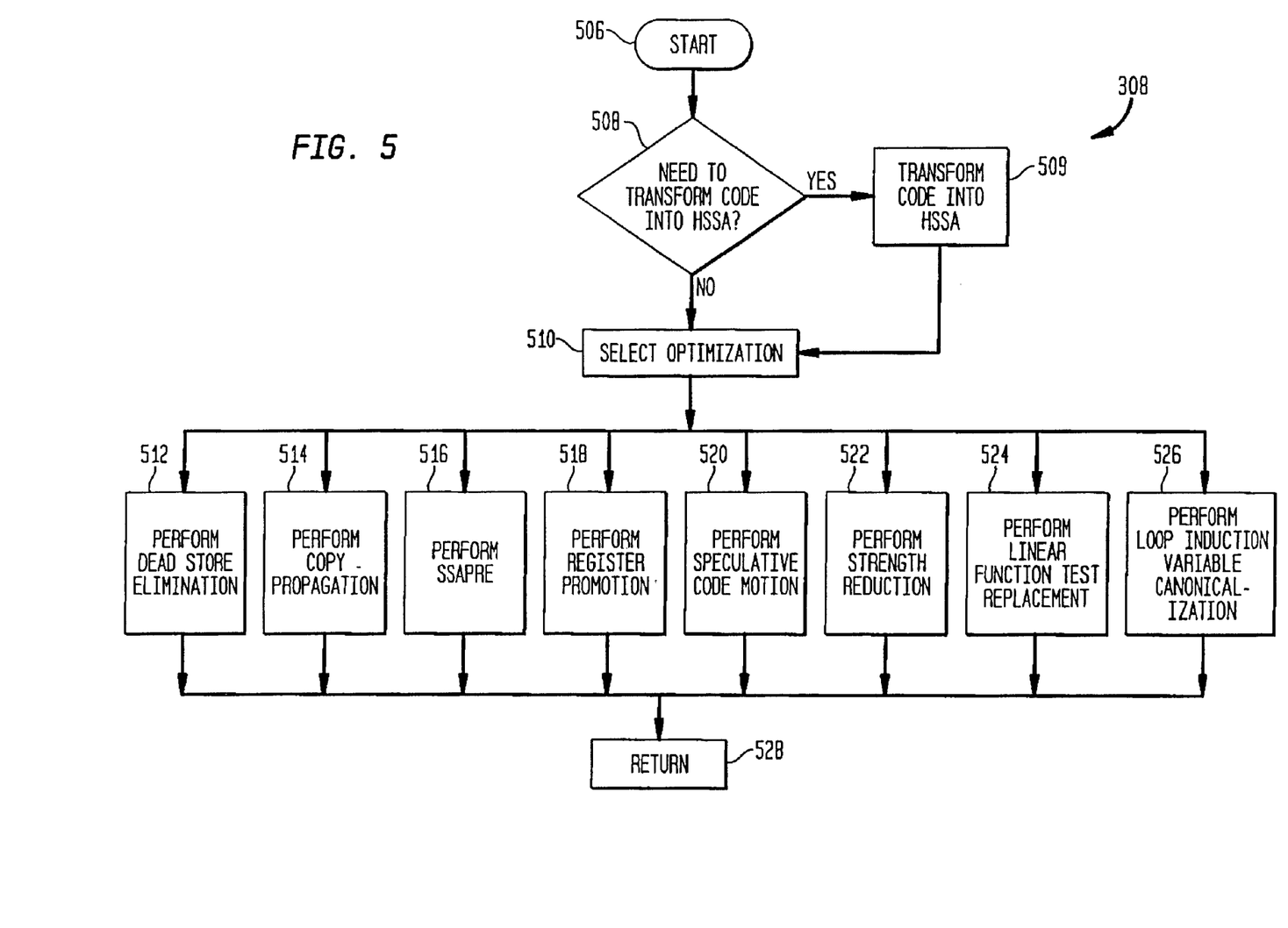
FIG. 5 is a flowchart representing the conversion of a program to HSSA form and the operation of SSA-based, SSA-preserving optimizations in the context of the embodiment of FIG. 4.
Figure 6:
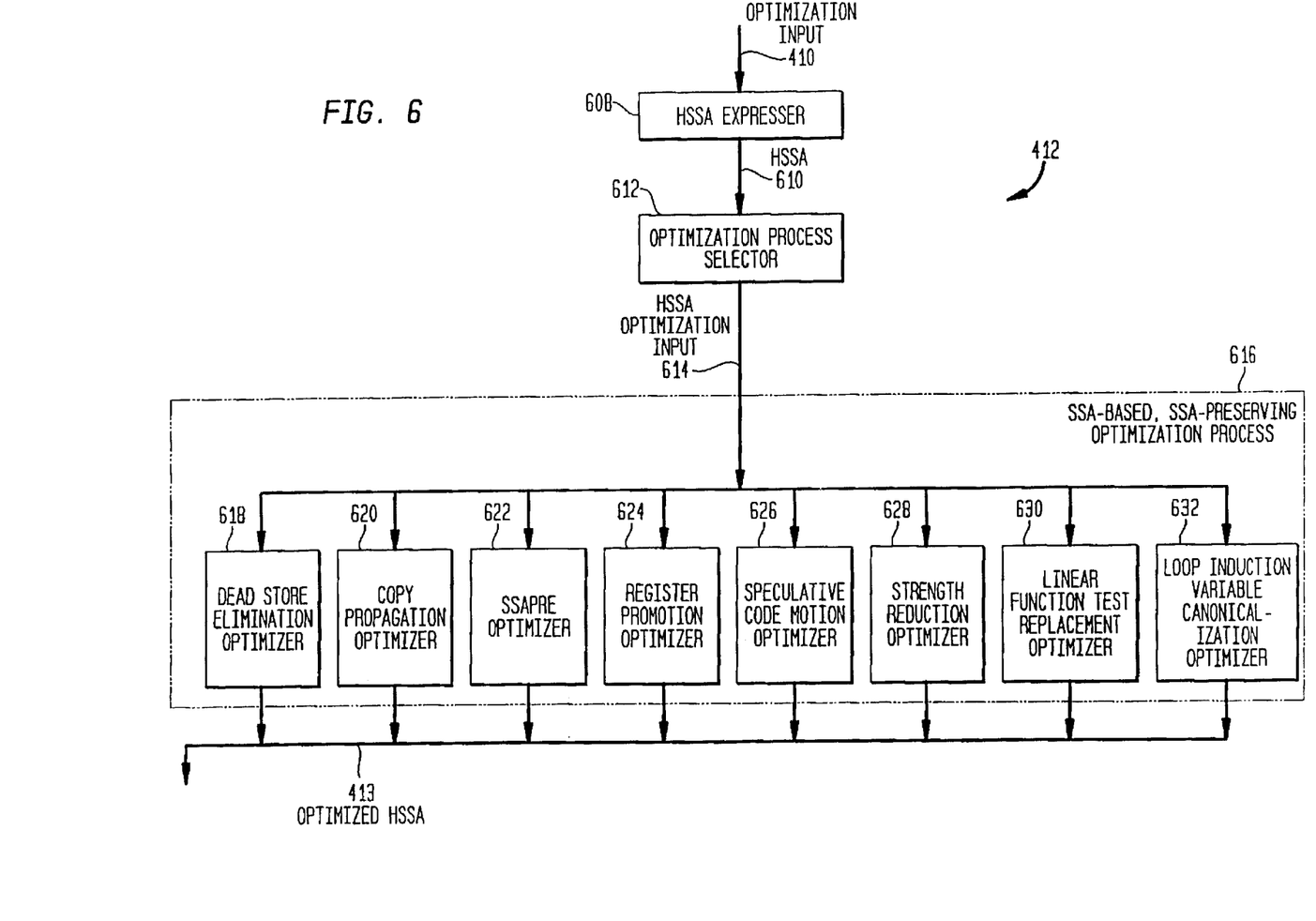
FIG. 6 is a diagram illustrating the operation of the SSA-based, SSA-preserving optimization module of the embodiment of FIG. 4.

Step 508 asks whether the existing code needs to be transformed into HSSA form. Note that at this point, the optimization input 410 may be the original source code. Alternatively, if other optimizations have already taken place, the existing code may be some form of IR. If the existing code needs to be expressed in HSSA form, then in step 509 the transformation is performed by an HSSA expresser 608. Transformation of code into HSSA form is discussed above in section III.

In step 510, an optimization process selector entity 612 chooses the specific SSA-based, SSA-preserving optimization. Note that the selector entity 612 may be either a human operator or an automated decision-making entity, such as a computer. In one embodiment, selector entity 612 performs no processing on its input other than to route it to another process. The HSSA form 610 acts as an HSSA optimization input 614 to one of the SSA-based, SSA-preserving optimization processes, collectively labeled 616. These alternative SSA-based, SSA-preserving optimizations, illustrated in steps 512 through 526 (and depicted as optimizers 618 through 632), are the same as those described above in section IV and are discussed therein. The output of the SSA-based, SSA-preserving optimization module 412 is an optimized HSSA form 413.

Note also that while the embodiment described here with respect to FIG. 5 identifies eight specific SSA-based, SSA-preserving optimizations, this description is illustrative and not intended to limit the present invention. Other embodiments of the invention may utilize a greater or lesser number, or may use other known or future SSA-based, SSA-preserving optimizations not discussed here.

Referring again to FIGS. 3 and 4, in step 310 an SSA-based, non-SSA-preserving optimization is chosen, performed by SSA-based, non-SSA-preserving optimization module 414. Such an optimization process is illustrated generically in FIG. 7. Module 414 is illustrated in greater detail in FIG. 8.

Figure 7:
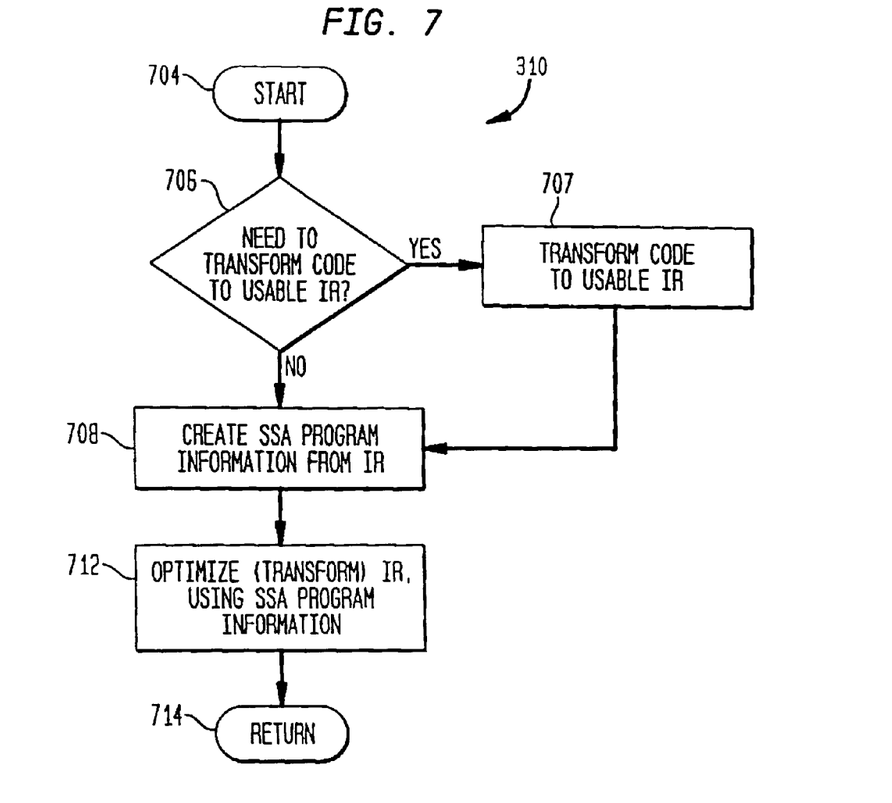
FIG. 7 is a flowchart representing the conversion of a program to an IR form and the operation of an SSA-based, non-SSA-preserving optimization in the context of the embodiment of FIG. 4.
Figure 8:
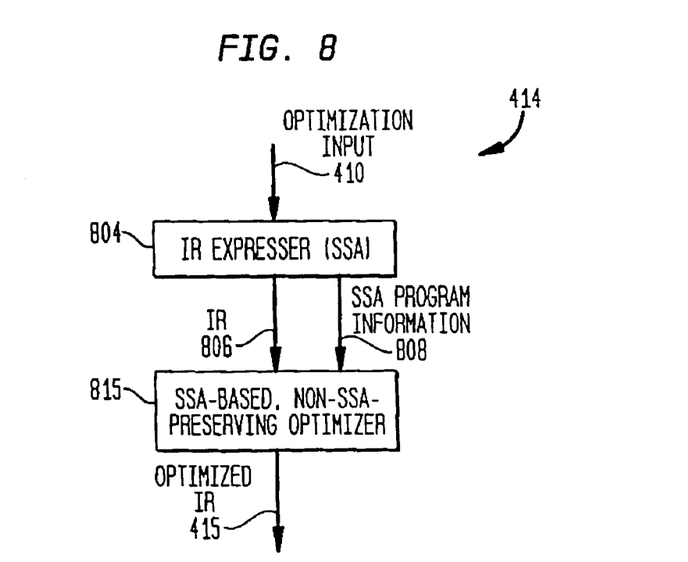
FIG. 8 is a diagram illustrating the operation of the SSA-based., non-SSA-preserving optimization module of the embodiment of FIG. 4.

Step 706 asks if the existing optimization input 410, whether it be the original source code or some IR, needs to be expressed as an IR that is usable for an SSA-based optimization. If so, in step 707 the optimization input 410 is transformed into an IR 806 by an IR expresser 804. In step 708, a body of SSA use-def program information 808 is created by the IR expresser 804, corresponding to the IR 806. In step 712, SSA-based, non-SSA-preserving optimizer 815 performs the optimizing transformation of the IR 806, using the IR 806 and the SSA use-def program information 808 as inputs. The result is the optimized IR 414.

Referring again to FIG. 3, step 312 represents performance of a generic optimization that is not SSA-based, by a non-SSA-based optimization module 416. This option is illustrated in greater detail in FIG. 9. Module 416 is illustrated in greater detail in FIG. 10.

Figure 9:
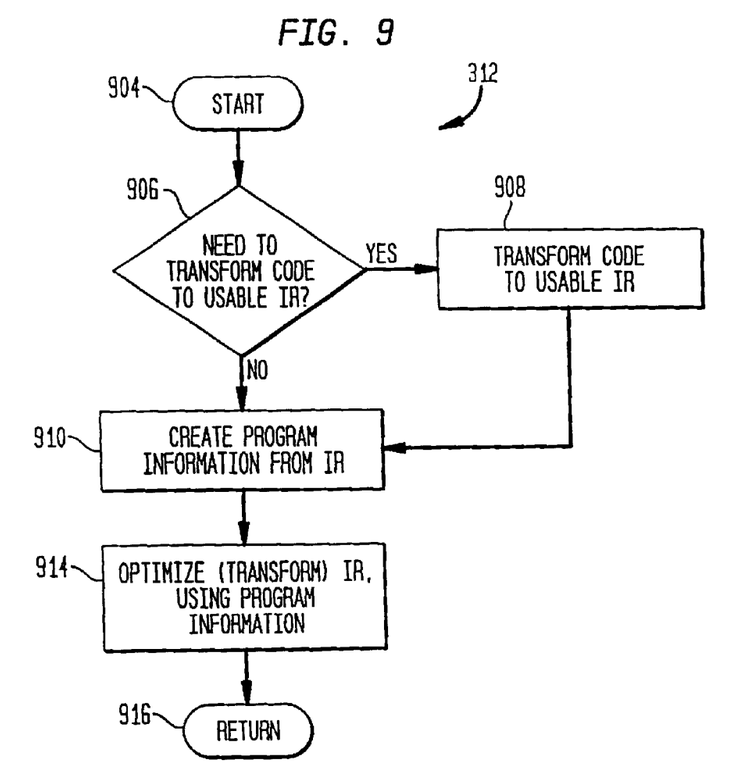
FIG. 9 is a flowchart representing the conversion of a program to an IR form and the operation of a non-SSA-based optimization in the context of the embodiment of FIG. 4.
Figure 10:
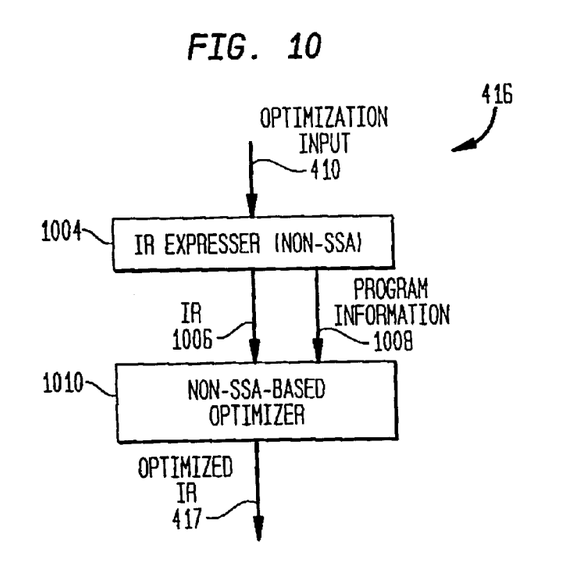
FIG. 10 is a diagram illustrating the operation of the non-SSA-based optimization module of the embodiment of FIG. 4.

Step 906 asks if the existing optimization input 410, whether it be the original source code or some IR, needs to be expressed as an IR that usable for this optimization. If so, in step 908 the optimization input 410 is transformed into an IR 1006 by an IR expresser 1004. In step 910, a body of program information 1008 is created by the IR expresser 1004 and corresponding to the IR 1006. In step 914, the optimizing transformation of the IR 1006 is performed by the non-SSA-based optimizer 1010, using the IR 1006 and the program information 1008 as inputs. The result is the optimized IR 417.

Note that after processing by any one of the optimization modules 412 through 416, the resulting optimized form may serve as optimization input 410 for the same or another optimization category chosen in step 306 by selector 408, should additional optimization be required in step 314. If no further optimization is required in step 314, a final body of optimized code 420 is submitted to a set of subsequent compilation processes 422.

The present invention is described in terms of the above example. This is for convenience only and is not intended to limit the application of the present invention. In fact, after reading the following description, it will be apparent to one skilled in the relevant art how to implement the following invention in alternative embodiments.

VI. Environment

Figure 11:
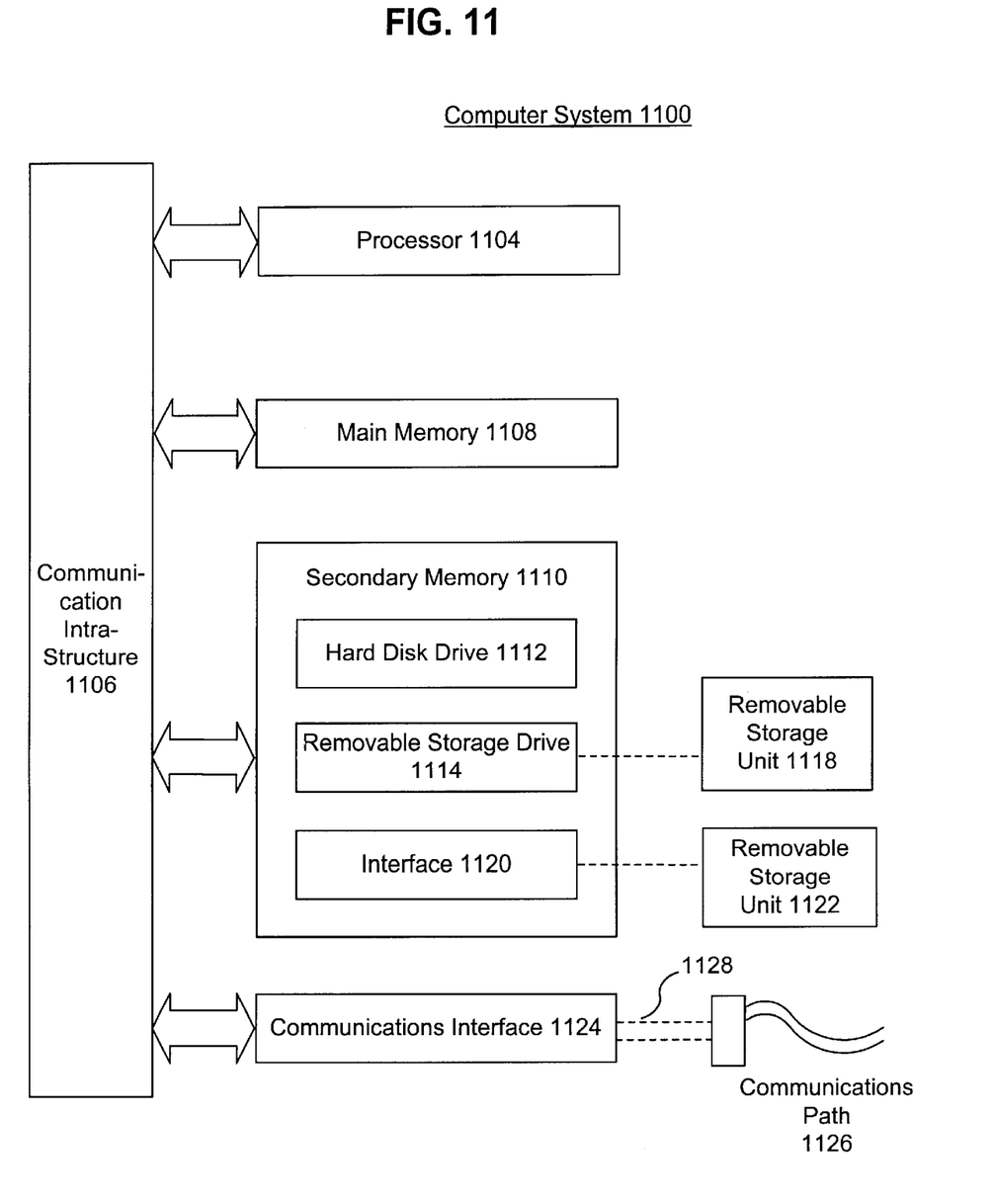
FIG. 11 is a block diagram of an example computer system useful for implementing the present invention.

The present invention may be implemented using hardware, software or a combination thereof and may be implemented in a computer system or other processing system. In fact, in one embodiment, the invention is directed toward one or more computer systems capable of carrying out the functionality described herein. An example of a computer system 1100 is shown in FIG. 11. The computer system 1100 includes one or more processors, such as processor 1104. The processor 1104 is connected to a communication infrastructure 1106 (e.g., a bus or network). Various software embodiments are described in terms of this exemplary computer system. After reading this description, it will become apparent to a person skilled in the relevant art how to implement the invention using other computer systems and/or computer architectures.

Computer system 1100 also includes a main memory 1108, preferably random access memory (RAM), and may also include a secondary memory 1110. The secondary memory 1110 may include, for example, a hard disk drive 1112 and/or a removable storage drive 1114, representing a floppy disk drive, a magnetic tape drive, an optical disk drive, etc. The removable storage drive 1114 reads from and/or writes to a removable storage unit 1118 in a well known manner. Removable storage unit 1118, represents a floppy disk. magnetic tape, optical disk, etc. which is read by and written to by removable storage drive 1114. As will be appreciated, the removable storage unit 1118 includes a computer usable storage medium having stored therein computer software and/or data.

In alternative embodiments, secondary memory 1110 may include other similar means for allowing computer programs or other instructions to be loaded into computer system 1100. Such means may include, for example, a removable storage unit 1122 and an interface 1120. Examples of such may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100

Computer system 1100 may also include a communications interface 1124. Communications interface 1124 allows software and data to be transferred between computer system 1100 and external devices. Examples of communications interface 1124 may include a modem, a network interface (such as an Ethernet card), a communications port, a PCMCIA slot and card, etc. Software and data transferred via communications interface 1124 are in the form of signals 1128 which may be electronic, electromagnetic, optical or other signals capable of being received by communications interface 1124. These signals 1128 are provided to communications interface 1124 via a communications path (i.e., channel) 1126. This channel 1126 carries signals 1128 and may be implemented using wire or cable, fiber optics, a phone line, a cellular phone link, an RF link and other communications channels.

In this document, the terms "computer program medium" and "computer usable medium" are used to generally refer to media such as removable storage drive 1114, a hard disk installed in hard disk drive 1112, and signals 1128. These computer program products are means for providing software to computer system 1100. The invention is directed to such computer program products.

Computer programs (also called computer control logic) are stored in main memory 1108 and/or secondary memory 1110. Computer programs may also be received via communications interface 1124. Such computer programs, when executed, enable the computer system 1100 to perform the features of the present invention as discussed herein. In particular, the computer programs, when executed, enable the processor 1104 to perform the features of the present invention. Accordingly, such computer programs represent controllers of the computer system 1100.

In an embodiment where the invention is implemented using software, the software may be stored in a computer program product and loaded into computer system 1100 using removable storage drive 1114, hard drive 1112 or communications interface 1124. Such an embodiment is illustrated in greater detail in FIG. 12. A compiler program 1202, containing an optimizer subprogram 1204 and other subprograms (such as a code generator 1206), is loaded into main memory 1108 from either removable storage drive 1114, hard drive 1112 or communications interface 1124, via the communication infrastructure 1106. Likewise a source code program that is to be optimized and compiled is loaded into main memory 1108. The compiler 1202 (software), when executed by the processor 1104, causes the processor 1104 to perform the functions of the invention as described herein.

Figure 12:
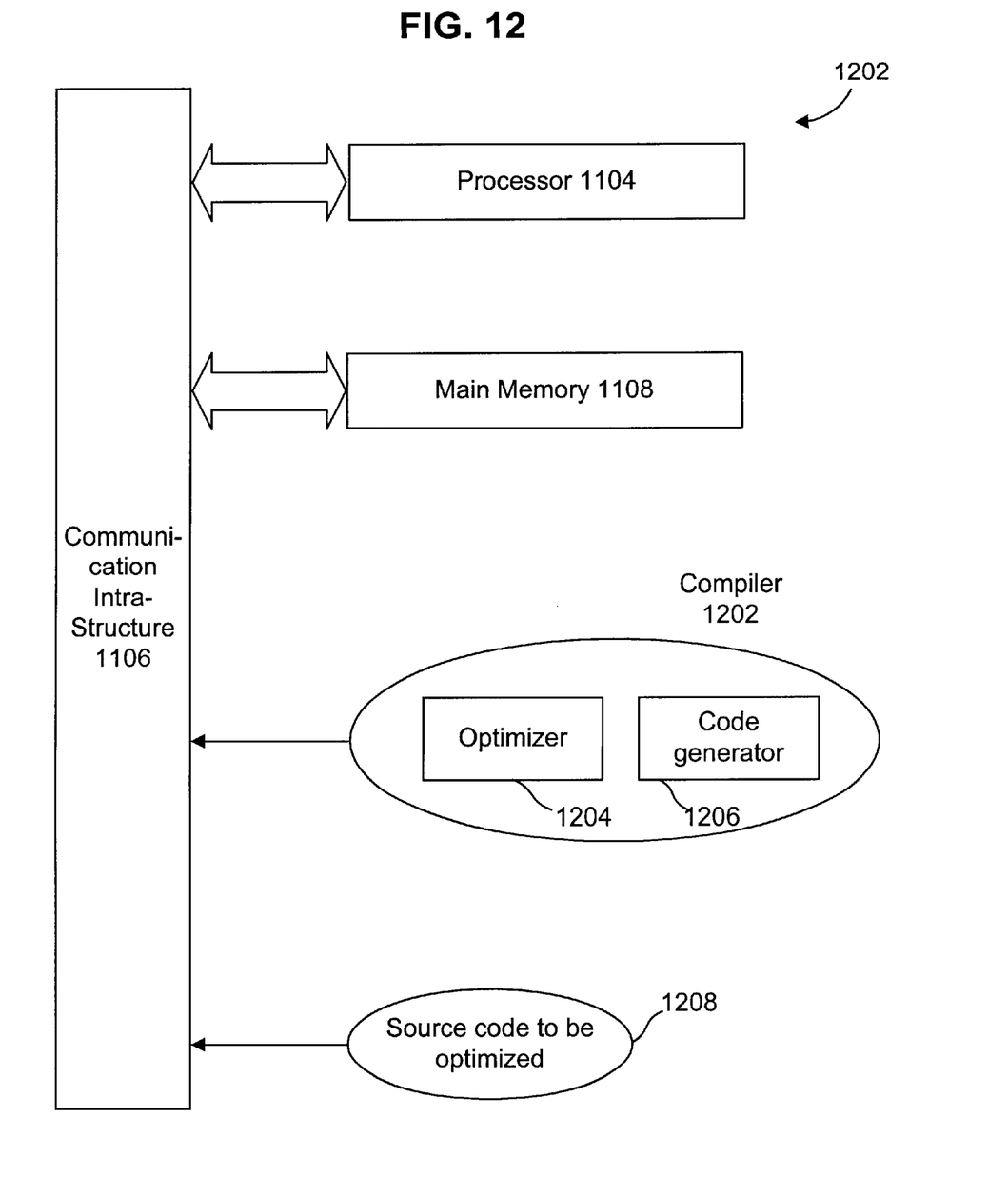
FIG. 12 is a block diagram illustrating the operation of the invention in the context of the example computer system of FIG. 11.

Note that in an embodiment where the invention is implemented using software, the optimizer 1204 corresponds to embodiments of the invention such as those illustrated in FIGS. 2 and 4. In the embodiment of FIG. 2, the optimizer 1204 would include software serving as the HSSA expresser 203, the selector entity 205, and optimizers 210 through 224. In the embodiment of FIG. 4, the optimizer 1204 would include software serving as the optimization category selector 408 and optimization modules 412 through 416.

In another embodiment, the invention is implemented using a combination of both hardware and software.

VII. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method of performing global scalar optimization of computer program code, within a compiler, comprising the steps of:

(1) expressing the computer program code in static single assignment (SSA) form; and (2) performing at least one SSA-based, SSA-preserving global scalar optimization procedure on the SSA form to produce an optimized SSA form, wherein each of said at least one procedure preserves utility of the SSA form, said at least one procedure comprises at least one of SSA partial redundancy elimination (SSAPRE), register promotion, speculative code motion, strength reduction, linear function test replacement, copy propagation, and loop induction variable cannonicalization, and any global scalar optimization performed is SSA-based and SSA preserving.

2. A system for performing global scalar optimization of computer program code, within a compiler, comprising the steps of:

(1) expressing logic for expressing the computer program code in static single assignment (SSA) form; and (2) performing logic for performing at least one SSA-based, SSA-preserving global scalar optimization procedure on the SSA form to produce an optimized SSA form, wherein each of said at least one procedure preserves utility of the SSA form, said at least one procedure comprises at least one of SSA partial redundancy elimination (SSAPRE), register promotion, speculative code motion, strength reduction, linear function test replacement, copy propagation, and loop induction variable cannonicalization, and any global scalar optimization performed is SSA-based and SSA preserving.

3. A computer program product comprising a computer usable medium having computer readable program code means embodied in said medium for causing an application program to execute on a computer, thereby performing global scalar optimization of computer program code, within a compiler, comprising the steps of:

(1) a computer readable program code means for causing the computer to express the computer program code in static single assignment (SSA) form; and (2) a computer readable program code means for causing the computer to perform at least one SSA-based, SSA-preserving global scalar optimization procedure on the SSA form to produce an optimized SSA form, wherein each of said at least one procedure preserves utility of the SSA form, said at least one procedure comprises at least one of SSA partial redundancy elimination (SSAPRE), register promotion, speculative code motion, strength reduction, linear function test replacement, copy propagation, and loop induction variable cannonicalization, and any global scalar optimization performed is SSA-based and SSA preserving.

* * * * *